US009001291B2

(12) United States Patent
Watakabe et al.

(10) Patent No.: US 9,001,291 B2
(45) Date of Patent: Apr. 7, 2015

(54) LIQUID CRYSTAL DISPLAY DEVICE

(75) Inventors: Hajime Watakabe, Fukaya (JP);
Arichika Ishida, Saitama (JP); Masato Hiramatsu, Tokyo (JP)

(73) Assignee: Japan Display Inc., Tokyo (JP)

( * ) Notice: Subject to any disclaimer, the term of this patent is extended or adjusted under 35 U.S.C. 154(b) by 117 days.

(21) Appl. No.: 13/357,196

(22) Filed: Jan. 24, 2012

(65) Prior Publication Data

US 2013/0021550 A1     Jan. 24, 2013

(30) Foreign Application Priority Data

Jul. 19, 2011 (JP) ................................ 2011-158425

(51) Int. Cl.
*G02F 1/1335* (2006.01)
*G02F 1/1362* (2006.01)

(52) U.S. Cl.
CPC .... *G02F 1/133514* (2013.01); *G02F 1/136209* (2013.01); *G02F 2001/133521* (2013.01); *G02F 2001/136222* (2013.01); *G02F 2201/346* (2013.01); *G02F 2202/104* (2013.01)

(58) Field of Classification Search
USPC ....................................................... 349/106
See application file for complete search history.

(56) References Cited

U.S. PATENT DOCUMENTS

| 7,807,557 | B2 * | 10/2010 | Yoshida et al. | 438/591 |
|---|---|---|---|---|
| 2005/0095514 | A1 * | 5/2005 | Lee et al. | 430/7 |
| 2006/0209004 | A1 * | 9/2006 | Nagai et al. | 345/102 |
| 2008/0273142 | A1 * | 11/2008 | Hirota et al. | 349/62 |
| 2010/0066952 | A1 * | 3/2010 | Tsuchiya et al. | 349/106 |
| 2010/0117517 | A1 * | 5/2010 | Cok et al. | 313/503 |
| 2010/0321607 | A1 * | 12/2010 | Utsumi et al. | 349/61 |
| 2011/0001909 | A1 * | 1/2011 | Tseng et al. | 349/106 |

FOREIGN PATENT DOCUMENTS

| WO | WO 95/17690 | A1 | 6/1995 | |
|---|---|---|---|---|
| WO | WO 9517690 | A1 * | 6/1995 | ............... G02B 5/20 |

* cited by examiner

*Primary Examiner* — Michael Caley
*Assistant Examiner* — Edmond Lau
(74) *Attorney, Agent, or Firm* — Oblon, McClelland, Maier & Neustadt, L.L.P.

(57) ABSTRACT

According to one embodiment, a liquid crystal display device includes an array substrate including a first color filter configured to transmit light in a first wavelength range, a second color filter configured to transmit light in a second wavelength range of greater wavelengths than the first wavelength range, a first switching element disposed above the second color filter, a second switching element disposed above the second color filter, a first pixel electrode which is electrically connected to the first switching element and is located above the first color filter, and a second pixel electrode which is electrically connected to the second switching element and is located above the second color filter.

16 Claims, 7 Drawing Sheets

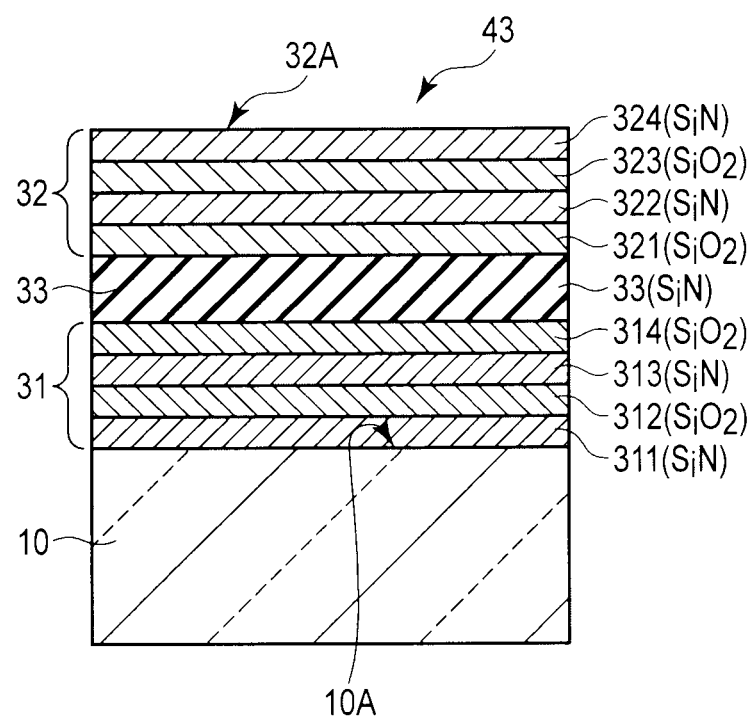
F I G. 6

LIQUID CRYSTAL DISPLAY DEVICE

CROSS-REFERENCE TO RELATED APPLICATIONS

This application is based upon and claims the benefit of priority from prior Japanese Patent Application No. 2011-158425, filed Jul. 19, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which thin-film transistors (TFTs) are incorporated in respective pixels as switching elements, there is known such a configuration that a transmissive liquid crystal display panel and a backlight are combined.

In a structure wherein a top-gate-type polysilicon TFT including a polysilicon semiconductor layer is applied as a switching element, a problem arises with an increase of OFF current due to an increase in luminance of a backlight. Specifically, a drain current of a TFT increases by the absorption of backlight in the polysilicon semiconductor layer. The increase in drain current conspicuously occurs in the state in which the TFT is in the OFF state, and such a drain current is called "photo-leakage current". In recent years, to meet a demand for a higher luminance of the screen, there is a tendency to increase the luminance of backlight. Consequently, there is concern that the display quality is adversely affected by, e.g. crosstalk or flicker due to the increase in photo-leakage current.

BRIEF DESCRIPTION OF THE DRAWINGS

FIG. 6 is a cross-sectional view which schematically shows a dielectric film multilayer with a 9-layer structure, which constitutes the first color filter, second color filter and third color filter.

DETAILED DESCRIPTION

Figure 1:
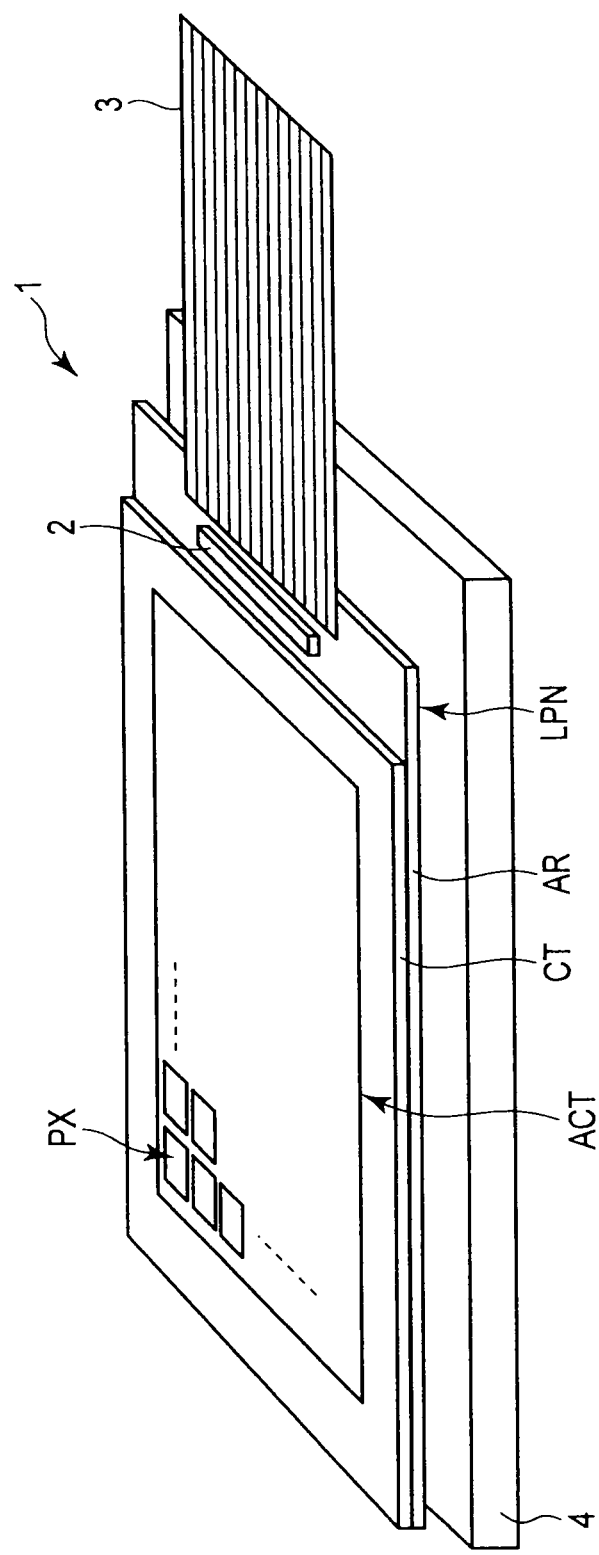
FIG. 1 is a view which schematically illustrates a structure of a liquid crystal display device according to an embodiment.

In general, according to one embodiment, a liquid crystal display device includes an array substrate including a first color filter configured to transmit light in a first wavelength range; a second color filter configured to transmit light in a second wavelength range of greater wavelengths than the first wavelength range; a first switching element disposed above the second color filter; a second switching element disposed above the second color filter; a first pixel electrode which is electrically connected to the first switching element and is located above the first color filter; and a second pixel electrode which is electrically connected to the second switching element and is located above the second color filter.

According to another embodiment, a liquid crystal display device includes an array substrate including an insulative substrate; a first semi-transmissive layer disposed on the insulative substrate; a first transmissive layer with a first film thickness, a second transmissive layer with a second film thickness which is different from the first film thickness, and a third transmissive layer with a third film thickness which is different from the first film thickness and the second film thickness, the first transmissive layer, the second transmissive layer and the third transmissive layer being disposed on the first semi-transmissive layer; a second semi-transmissive layer disposed on the first transmissive layer to constitute a first color filter configured to transmit light in a first wavelength range, disposed on the second transmissive layer to constitute a second color filter configured to transmit light in a second wavelength range of greater wavelengths than the first wavelength range, and disposed on the third transmissive layer to constitute a third color filter configured to transmit light in a third wavelength range of greater wavelengths than the second wavelength range; a first switching element, a second switching element and a third switching element, which are disposed on the second semi-transmissive layer which constitutes the second color filter or the third color filter; a first pixel electrode which is electrically connected to the first switching element and is located above the first color filter; a second pixel electrode which is electrically connected to the second switching element and is located above the second color filter; and a third pixel electrode which is electrically connected to the third switching element and is located above the third color filter.

According to another embodiment, a liquid crystal display device includes an array substrate including an insulative substrate, a dielectric film multilayer formed on the insulative substrate and configured to reflect light of a blue wavelength to the insulative substrate side, a top-gate-type thin-film transistor including a silicon semiconductor layer disposed on the dielectric film multilayer, and a pixel electrode electrically connected to the thin-film transistor; a counter-substrate disposed to be opposed to the array substrate; and a liquid crystal layer held between the array substrate and the counter-substrate.

Embodiments will now be described in detail with reference to the accompanying drawings. In the drawings, structural elements having the same or similar functions are denoted by like reference numerals, and an overlapping description is omitted.

FIG. 1 is a view which schematically illustrates a structure of a liquid crystal display device according to an embodiment.

Specifically, the liquid crystal display device 1 includes an active-matrix-type transmissive liquid crystal display panel LPN, a driving IC chip 2 and a flexible wiring board 3 which are connected to the liquid crystal display panel LPN, and a backlight 4 which illuminates the liquid crystal display panel LPN.

The liquid crystal display panel LPN includes an array substrate AR, a counter-substrate CT which is disposed to be opposed to the array substrate AR, and a liquid crystal layer which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The backlight 4 is disposed on the back side of the array substrate AR. As the backlight 4, use may be made of either a backlight including a light-emitting diode (LED) as a light source, or a backlight including a cold cathode fluorescent lamp (CCFL) as a light source. A description of the detailed structure of the backlight 4 is omitted.

Figure 2:
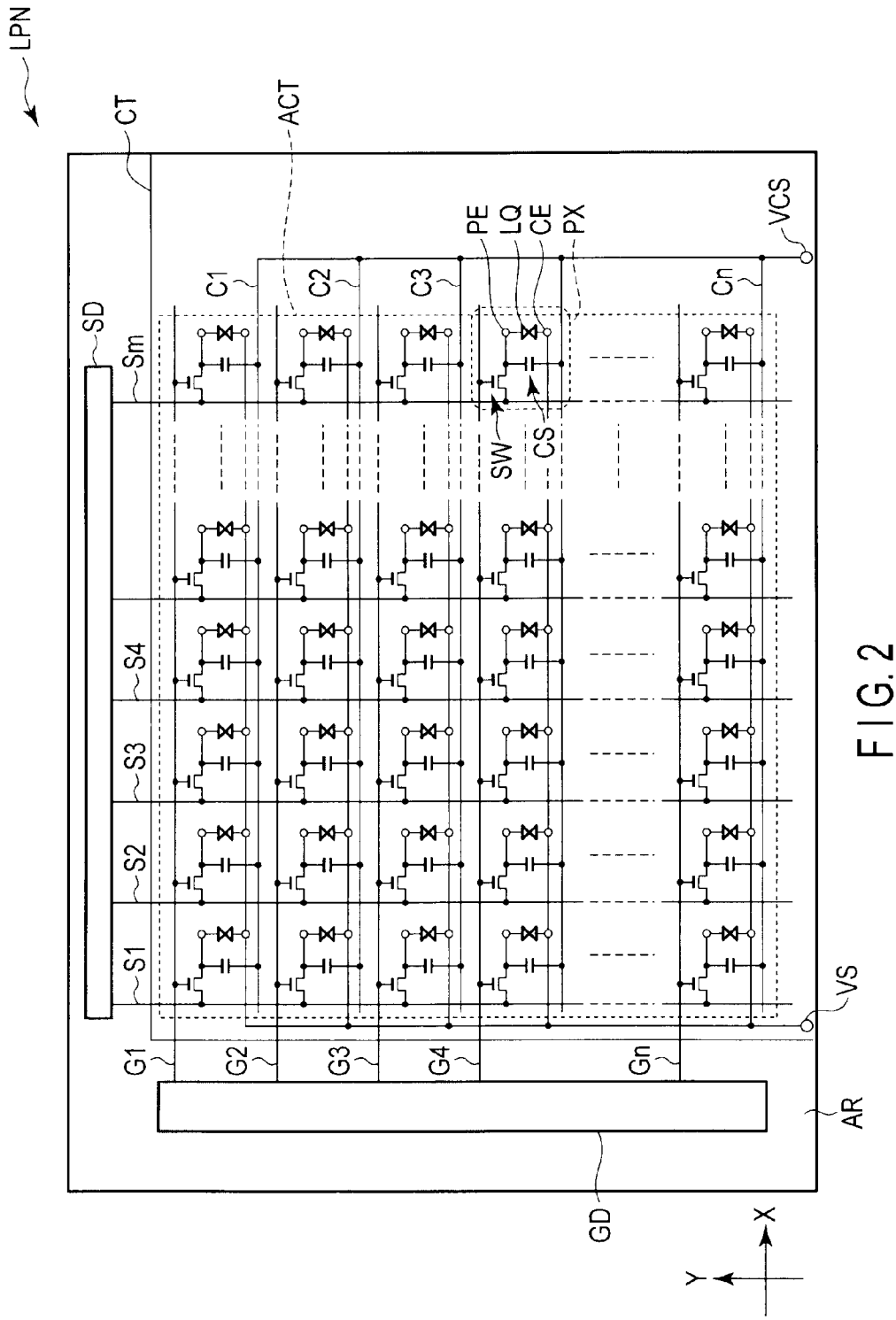
FIG. 2 is a view which schematically illustrates a structure and an equivalent circuit of a liquid crystal display panel shown in FIG. 1.

FIG. 2 is a view which schematically shows a structure and an equivalent circuit of the liquid crystal display panel LPN shown in FIG. 1.

The array substrate AR includes, in the active area ACT, a plurality of gate lines G (G1 to Gn), a plurality of storage capacitance lines C (C1 to Cn), and a plurality of source lines S (S1 to Sm). Each of the gate lines G is led out of the active area ACT and is connected to a gate driver GD. Each of the source lines S is led out of the active area ACT and is connected to a source driver SD.

Each of the pixels PX includes a switching element SW, a pixel electrode PE and a counter-electrode CE. The switching element SW is electrically connected to the gate line G and source line S. The pixel electrode PE is electrically connected to the switching element SW. The counter-electrode CE is formed common to plural pixel electrodes PE via a liquid crystal layer LQ. The counter-electrode CE is electrically connected to a power supply module VS.

In the present embodiment, the switching element SW and pixel electrodes PE are provided on the array substrate AR. On the other hand, the counter-electrode CE may be provided on the array substrate AR, or on the counter-substrate CT. In the liquid crystal display panel LPN that is configured such that the counter-electrode CE, as well as the pixel electrodes PE, is disposed on the array substrate AR, liquid crystal molecules, which constitute the liquid crystal layer LQ, are switched by mainly using a lateral electric field which is produced between the pixel electrodes PE and the counter-electrode CE. In the liquid crystal display panel LPN that is configured such that the counter-electrode CE is disposed on the counter-substrate CT, the liquid crystal molecules, which constitute the liquid crystal layer LQ, are switched by mainly using a vertical electric field or an oblique electric field, which is produced between the pixel electrodes PE and the counter-electrode CE.

Figure 3:
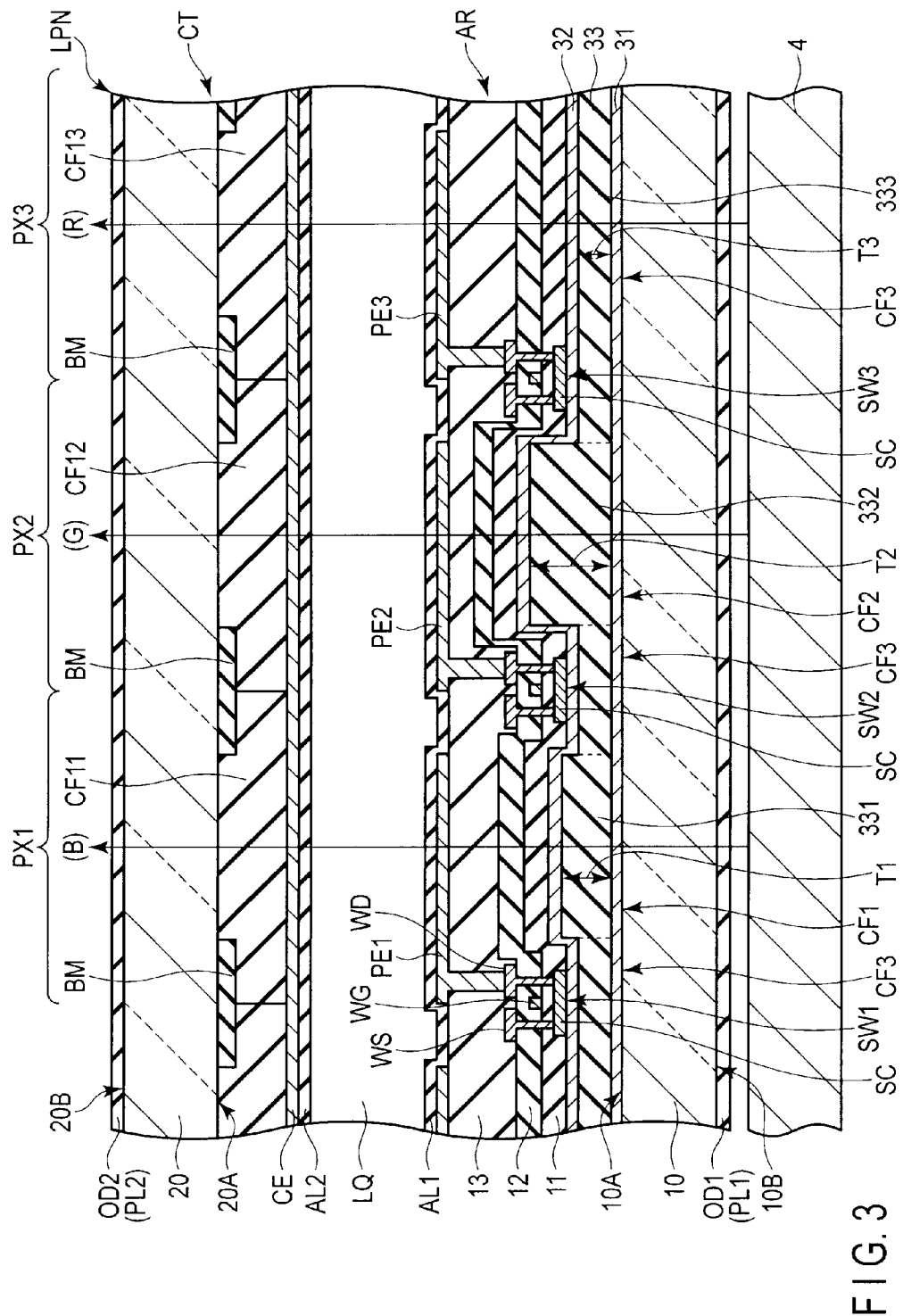
FIG. 3 is a view which schematically shows a cross-sectional structure of the liquid crystal display panel shown in FIG. 2.

FIG. 3 is a view which schematically shows a cross-sectional structure of the liquid crystal display panel LPN shown in FIG. 2. FIG. 3 shows cross-sectional structures of a first pixel PX1 which displays blue, a second pixel PX2 which displays green, and a third pixel PX3 which displays red.

Specifically, the first pixel PX1 includes a first color filter CF1, a first switching element SW1 and a first pixel electrode PE1. The second pixel PX2 includes a second color filter CF2, a second switching element SW2 and a second pixel electrode PE2. The third pixel PX3 includes a third color filter CF3, a third switching element SW3 and a third pixel electrode PE3.

The array substrate AR is formed by using a first insulative substrate 10 with light transmissivity, such as a glass substrate. The first color filter CF1, second color filter CF2 and third color filter CF3 are disposed on the first insulative substrate 10. The first color filter CF1 transmits light of a first wavelength range (e.g. wavelength range of 400 nm to 500 nm) which is a blue wavelength range. The second color filter CF2 transmits light of a second wavelength range (e.g. wavelength range of 500 nm to 580 nm) which is a green wavelength range and is a range of greater wavelengths than the first wavelength range. The third color filter CF3 transmits light of a third wavelength range (e.g. wavelength range of 580 nm to 700 nm) which is a red wavelength range and is a range of greater wavelengths than the second wavelength range.

The first color filter CF1, second color filter CF2 and third color filter CF3 mainly reflect light of wavelengths, which are other than the light of wavelengths that is transmitted. The first color filter CF1 has a higher reflectance in the second wavelength range and the third wavelength range than in the first wavelength range. The second color filter CF2 has a higher reflectance in the first wavelength range and the third wavelength range than in the second wavelength range. The third color filter CF3 has a higher reflectance in the first wavelength range and the second wavelength range than in the third wavelength range.

As will be described later in detail, the backlight 4, which is applied to the embodiment, has a light emission spectrum having a light emission peak (about 450 nm) in the first wavelength range. The second color filter CF2 and third color filter CF3 have such reflectance characteristics that the reflectance in the neighborhood of 450 nm, which is the light emission peak of the backlight 4, is higher than the reflectance in the second wavelength range and third wavelength range.

In the example illustrated, the first color filter CF1 is disposed in accordance with the first pixel PX1, except under the first switching element SW1. The second color filter CF2 is disposed in accordance with the second pixel PX2, except under the second switching element SW2. The third color filter CF3 is disposed in accordance with the third pixel PX3. In addition, the third color filter CF3 is also disposed under the first switching element SW1, second switching element SW2 and third switching element SW3. In the example illustrated, the third color filter CF3 is applied as the underlayer of the first switching element SW1, second switching element SW2 and third switching element SW3. Alternatively, the second color filter CF2, which reflects light of the first wavelength range, may be applied.

As the first color filter CF1, second color filter CF2 and third color filter CF3, light-absorption-type filters (e.g. filters formed of colored resins) may be used. In the example illustrated, however, Fabry-Ferot-type filters, which make use of the principle of optical interference, are adopted. Specifically, the first color filter CF1, second color filter CF2 and third color filter CF3 are formed by stacking a plurality of thin films with different refractive indices, and include a first semi-transmissive layer 31 which is disposed on an inner surface 10A of the first insulative substrate 10, a second semi-transmissive layer 32 which is opposed to the first semi-transmissive layer 31, and a transmissive layer (or a spacer layer) 33 which is disposed between the first semi-transmissive layer 31 and the second semi-transmissive layer 32.

To be more specific, the first semi-transmissive layer 31 and the second semi-transmissive layer 32 are provided common to the first color filter CF1, second color filter CF2 and third color filter CF3. Each of the first semi-transmissive layer 31 and the second semi-transmissive layer 32 may be a metal thin film formed of, silver (Ag) with a thickness on the several-ten nm order, or may be a multilayer structure in which a plurality of dielectric films with different refractive indices are stacked. For example, each of the first semi-transmissive layer 31 and the second semi-transmissive layer 32 can be formed by a multilayer in which a silicon nitride (SiN) layer and a silicon oxide ($SiO_2$) layer are alternately stacked. The number of stacked dielectric films of the multiplayer is two or more. However, as the number of layers increases, the number of fabrication steps increases and the manufacturing cost increases. It is thus desirable that the number of layers be set at four or less.

The transmissive layer 33 is a single dielectric film, and can be formed of a silicon nitride layer or a silicon oxide layer. The transmissive layer 33 includes a first transmissive layer 331, a second transmissive layer 332 and a third transmissive layer 333, which have different film thicknesses.

The first color filter CF1 includes the first transmissive layer 331 with a first film thickness T1, as the transmissive layer 33 disposed between the first semi-transmissive layer 31 and second semi-transmissive layer 32. The second color filter CF2 includes the second transmissive layer 332 with a second film thickness T2, which is different from the first film thickness T1, as the transmissive layer 33 disposed between the first semi-transmissive layer 31 and second semi-transmissive layer 32. The third color filter CF3 includes the third transmissive layer 333 with a third film thickness T3, which is different from the first film thickness T1 and second film thickness T2, as the transmissive layer 33 disposed between the first semi-transmissive layer 31 and second semi-transmissive layer 32. The first transmissive layer 331, second transmissive layer 332 and third transmissive layer 333, although having different film thicknesses, are mutually continuous. In the example illustrated, the second film thickness T2 is greater than the first film thickness T2, and the third film thickness T3 is less than the first film thickness T1.

The first switching element SW1, second switching element SW2 and third switching element SW3 are all composed of top-gate-type thin-film transistors (TFTs), and have substantially the same structure. In the description below, the first switching element SW1 is described more concretely, and a description of the structure of each of the second switching element SW2 and third switching element SW3 is omitted.

Specifically, the first switching element SW1 includes a semiconductor layer SC which is disposed on the third color filter CF3 (strictly speaking, on the second semi-transmissive layer 32). The silicon semiconductor layer is formed of polysilicon, but there may be a case in which the silicon semiconductor layer is formed of amorphous silicon. The silicon semiconductor layer SC is covered with a first insulation film 11. The first insulation film 11 covers the first color filter CF1, second color filter CF2, and third color filter CF3.

A gate electrode WG of the first switching element SW1 is formed on the first insulation film 11 and is located immediately above the silicon semiconductor layer SC. The gate electrode WG is electrically connected to the gate line and is covered with a second insulation film 12. The second insulation film 12 is also disposed on the first insulation film 11.

A source electrode WS and a drain electrode WD of the first switching element SW1 are formed on the second insulation film 12. The source electrode WS is electrically connected to the source line. The source electrode WS and drain electrode WD are put in contact with the silicon semiconductor layer SC via contact holes which penetrate the first insulation film 11 and second insulation film 12.

The first switching element SW1 having the above-described structure is covered with a third insulation film 13. Similarly, the second switching element SW2 and third switching element SW3 are covered with the third insulation film 13. The third insulation film 13 is also disposed on the second insulation film 12.

The first pixel electrode PE1 is formed on the third insulation film 13 and is located above the first color filter CF1. The first pixel electrode PE1 is electrically connected to the drain electrode WD of the first switching element SW1 via a contact hole which penetrates the third insulation film 13.

Similarly, the second pixel electrode PE2 is formed on the third insulation film 13 and is located above the second color filter CF2. The second pixel electrode PE2 is electrically connected to the drain electrode WD of the second switching element SW2. In addition, similarly, the third pixel electrode PE3 is formed on the third insulation film 13 and is located above the third color filter CF3, and is electrically connected to the drain electrode WD of the third switching element SW3.

The first pixel electrode PE1, second pixel electrode PE2 and third pixel electrode PE3 are formed of a light-transmissive, electrically conductive material, such as indium tin oxide (ITO) or indium zinc oxide (IZO). These first pixel electrode PE1, second pixel electrode PE2 and third pixel electrode PE3 are covered with a first alignment film AL1.

The counter-substrate CT is formed by using a second insulative substrate 20 having light transmissivity, such as a glass substrate. The counter-substrate CT includes a black matrix BM on an inner surface 20A of the second insulative substrate 20, which is opposed to the array substrate AR. The black matrix BM is formed so as to be opposed to the first switching element SW1, second switching element SW2 and third switching element SW3, and wiring parts such as source lines, gate lines, and storage capacitance lines.

In the example illustrated, the counter-substrate CT includes a first color layer CF11, a second color layer CF12 and a third color layer CF13 on the inner surface 20A of the second insulative substrate 20, but the first color layer CF11, second color layer CF12 and third color layer CF13 may be dispensed with. The first color layer CF11 is formed of a color resin (e.g. blue resin) which transmits light of the first wavelength range. The second color layer CF12 is formed of a color resin (e.g. green resin) which transmits light of the second wavelength range. The third color layer CF13 is formed of a color resin (e.g. red resin) which transmits light of the third wavelength range.

In addition, in the example illustrated, the counter-electrode CT includes the counter-electrode CE on those surfaces of the first color layer CF11, second color layer CF12 and third color layer CF13, which are opposed to the array substrate AR. The counter-electrode CE, as described above, may be provided on the array substrate AR. The counter-electrode CE is formed of a light-transmissive, electrically conductive material, such as ITO or IZO. That surface of the counter-electrode CT, which is opposed to the array substrate AR, is covered with a second alignment film AL2.

The above-described array substrate AR and counter-substrate CT are disposed such that their first alignment film AL1 and second alignment film AL2 are opposed to each other. In this case, a predetermined cell gap, for example, a cell gap of 2 to 7 µm, is created between the array substrate AR and the counter-substrate CT by columnar spacers which are formed of, e.g. a resin material so as to be integral to one of the array substrate AR and counter-substrate CT. The liquid crystal layer LQ is held in the cell gap which is created between the array substrate AR and the counter-substrate CT, and is disposed between the first alignment film AL1 and second alignment film AL2.

A first optical element OD1, which includes, e.g. a first polarizer PL1, is disposed on an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. A second optical element OD2, which includes, e.g. a second polarizer PL2, is disposed on an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN.

According to the above-described structure, when light emitted from the backlight 4 has passed through the liquid crystal display panel LPN, transmissive light traveling through the first pixel electrode PE1 via the first color filter CF1 is colored in blue (B), transmissive light traveling through the second pixel electrode PE2 via the second color filter CF2 is colored in green (G), and transmissive light traveling through the third pixel electrode PE3 via the third color filter CF3 is colored in red (R). That part of the light, which has not passed through the first color filter CF1, second color filter CF2 and third color filter CF3, is almost entirely reflected, sent back to the backlight 4, and re-used. Specifically, the backlight 4 has a high-reflectance surface which covers the light source, etc, and the reflective light reflected toward the backlight 4 is then reflected once again toward the liquid crystal display panel LPN, with little light loss at the high-reflectance surface. Thus, the reflective light from the first color filter CF1, second color filter CF2 and third color filter CF3 is re-used, and the efficiency of use of light is improved.

Next, more concrete structure examples of the first color filter CF1, second color filter CF2 and third color filter CF3 are described.

Figure 4:
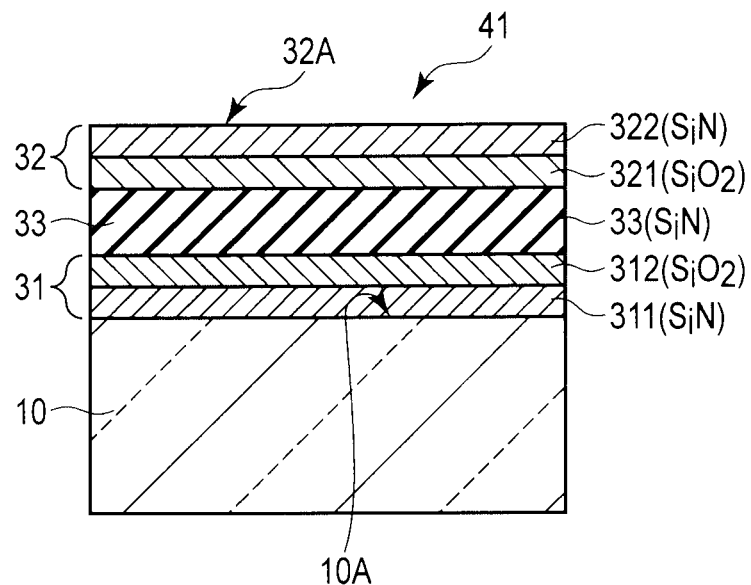
FIG. 4 is a cross-sectional view which schematically shows a dielectric film multilayer with a 5-layer structure, which constitutes a first color filter, a second color filter and a third color filter.

FIG. 4 is a cross-sectional view which schematically shows a dielectric film multilayer 41 with a 5-layer structure, which constitutes the first color filter CF1, second color filter CF2 and third color filter CF3.

Specifically, the dielectric film multilayer 41 is composed of a first silicon nitride layer 311 which is disposed on the inner surface 10A of the first insulative substrate 10; a first silicon oxide layer 312 stacked on the first silicon nitride layer 311; a second silicon nitride layer 33 stacked on the first silicon oxide layer 312; a second silicon oxide layer 321 stacked on the second silicon nitride layer 33; and a third silicon nitride layer 322 stacked on the second silicon oxide layer 321.

The first silicon nitride layer 311 and first silicon oxide layer 312 function as the first semi-transmissive layer 31. The second silicon nitride layer 33 functions as the transmissive layer 33. The second silicon oxide layer 321 and third silicon nitride layer 322 function as the second semi-transmissive layer 32. Specifically, each of the first semi-transmissive layer 31 and second semi-transmissive layer 32 is a dielectric multilayer of two layers.

The first insulative substrate 10 is a glass substrate, and the refractive index thereof in the visible light wavelength range is about 1.5. The first silicon nitride layer 311, second silicon nitride layer 33 and third silicon nitride layer 322 are formed of, e.g. SiN, and the refractive index thereof in the visible light wavelength range is about 2.0 to 2.7. Specifically, the first silicon nitride layer 311, second silicon nitride layer 33 and third silicon nitride layer 322 function as high-refractive-index layers having a higher refractive index than the first insulative substrate 10. The first silicon oxide layer 312 and second silicon oxide layer 321 are formed of, e.g. $SiO_2$, and the refractive index thereof in the visible light wavelength range is about 1.5. Specifically, the first silicon oxide layer 312 and second silicon oxide layer 321 function as low-refractive-index layers having a lower refractive index than the high-refractive-index layers.

The first silicon nitride layer 311 and third silicon nitride layer 322 have the same thickness, for example, 60 nm, in each of the first color filter CF1, second color filter CF2 and third color filter CF3. The first silicon oxide layer 312 and second silicon oxide layer 321 have the same thickness, for example, 90 nm, in each of the first color filter CF1, second color filter CF2 and third color filter CF3. Specifically, the low-refractive-index layers, which constitute the first semi-transmissive layer 31 and second semi-transmissive layer 32, are thicker than the high-refractive-index layers.

The second silicon nitride layer 33 has different film thicknesses in the first color filter CF1, second color filter CF2 and third color filter CF3, respectively. For example, the thickness of the second silicon nitride layer 33 in the first color filter CF1 is about 85 nm, the thickness of the second silicon nitride layer 33 in the second color filter CF2 is about 115 nm, and the thickness of the second silicon nitride layer 33 in the third color filter CF3 is about 150 nm.

The first color filter CF1, which is composed of the dielectric film multilayer 41 having the above-described structure, has a transmittance peak in the neighborhood of 470 nm, and has a reflectance bottom in the neighborhood of the same wavelength. Similarly, the second color filter CF2 has a transmittance peak in the neighborhood of 540 nm, and has a reflectance bottom in the neighborhood of the same wavelength. Likewise, the third color filter CF3 has a transmittance peak in the neighborhood of 610 nm, and has a reflectance bottom in the neighborhood of the same wavelength, while having a high reflectance in the wavelength range other than this wavelength.

The third silicon nitride layer 322 of the second color filter CF2 or third color filter CF3 serves as an underlayer of the silicon semiconductor layer. The silicon semiconductor layer has a high light absorption coefficient at short wavelengths. On the other hand, the backlight, which is combined with the liquid crystal display panel, has such a light emission spectrum that the light intensity at relatively short wavelengths is high. As described above, since the second color filter CF2 or third color filter CF3, which is disposed under the silicon semiconductor layer, has a relatively high reflectance in the wavelength range of short wavelengths, this second color filter CF2 or third color filter CF3 can suppress light absorption in the silicon semiconductor layer. Accordingly, in the switching element including this silicon semiconductor layer, photo-leakage current can be reduced. Thereby, the occurrence of crosstalk or flicker can be suppressed, and a liquid crystal display device with a good display quality can be provided.

Figure 5:
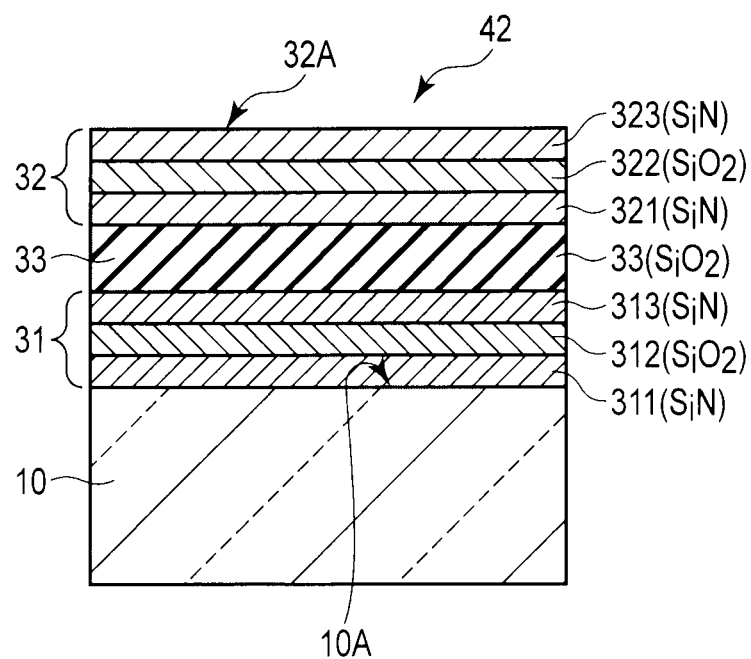
FIG. 5 is a cross-sectional view which schematically shows a dielectric film multilayer with a 7-layer structure, which constitutes the first color filter, second color filter and third color filter.

FIG. 5 is a cross-sectional view which schematically shows a dielectric film multilayer 42 with a 7-layer structure, which constitutes the first color filter CF1, second color filter CF2 and third color filter CF3.

Specifically, the dielectric film multilayer 42 is composed of a first silicon nitride layer 311 which is disposed on the inner surface 10A of the first insulative substrate 10; a first silicon oxide layer 312 stacked on the first silicon nitride layer 311; a second silicon nitride layer 313 stacked on the first silicon oxide layer 312; a second silicon oxide layer 33 stacked on the second silicon nitride layer 313; a third silicon nitride layer 321 stacked on the second silicon oxide layer 33; a third silicon oxide layer 322 stacked on the third silicon nitride layer 321; and a fourth silicon nitride layer 323 stacked on the third silicon oxide layer 322.

The first silicon nitride layer 311, first silicon oxide layer 312 and second silicon nitride layer 313 function as the first semi-transmissive layer 31. The second silicon oxide layer 33 functions as the transmissive layer 33. The third silicon nitride layer 321, third silicon oxide layer 322 and fourth silicon nitride layer 323 function as the second semi-transmissive layer 32. Specifically, each of the first semi-transmissive layer 31 and second semi-transmissive layer 32 is a dielectric multilayer of three layers.

The first silicon nitride layer 311, second silicon nitride layer 313, third silicon nitride layer 321 and fourth silicon nitride layer 323 are formed of, e.g. SiN, and function as high-refractive-index layers (the refractive index in the visible light wavelength range is about 2.0 to 2.7). The first silicon oxide layer 312, second silicon oxide layer 33 and third silicon oxide layer 322 are formed of, e.g. $SiO_2$, and function as low-refractive-index layers (the refractive index in the visible light wavelength range is about 1.5).

The first silicon nitride layer 311, second silicon nitride layer 313, third silicon nitride layer 321 and fourth silicon nitride layer 323 have the same thickness, for example, 60 nm, in each of the first color filter CF1, second color filter CF2 and third color filter CF3. The first silicon oxide layer 312 and third silicon oxide layer 322 have the same thickness, for example, 90 nm, in each of the first color filter CF1, second color filter CF2 and third color filter CF3.

The second silicon oxide layer 33 has different film thicknesses in the first color filter CF1, second color filter CF2 and third color filter CF3, respectively. For example, the thickness of the second silicon oxide layer 33 in the first color filter CF1 is about 130 nm, the thickness of the second silicon oxide layer 33 in the second color filter CF2 is about 180 nm, and the thickness of the second silicon oxide layer 33 in the third color filter CF3 is about 30 nm.

The fourth silicon nitride layer 323 of the second color filter CF2 or third color filter CF3 serves as an underlayer of the silicon semiconductor layer.

The first color filter CF1, which is formed of the dielectric film multilayer 42 having the above-described structure, has a transmittance peak and a reflectance bottom in the neighborhood of 470 nm. In addition, in this first color filter CF1, compared to the first color filer CF1 that is formed of the dielectric film multilayer 41, the wavelength range in the neighborhood of the transmittance peak and reflectance bottom becomes narrower, and the wavelength range of a high reflectance becomes wider. Similarly, the second color filter CF2, which is formed of the dielectric film multilayer 42, has a transmittance peak and a reflectance bottom in the neighborhood of 540 nm. In addition, in this second color filter CF2, compared to the second color filer CF2 that is formed of the dielectric film multilayer 41, the wavelength range in the neighborhood of the transmittance peak and reflectance bottom becomes narrower, and the wavelength range of a high reflectance becomes wider. Likewise, the third color filter CF3, which is formed of the dielectric film multilayer 42, has a transmittance peak and a reflectance bottom in the neighborhood of 610 nm. In addition, in this third color filter CF3, compared to the third color filer CF3 that is formed of the dielectric film multilayer 41, the wavelength range in the neighborhood of the transmittance peak and reflectance bottom becomes narrower, and the wavelength range of a high reflectance becomes wider.

As has been described above, by increasing the number of layers of the dielectric film multilayer, the wavelength range in the neighborhood of the transmittance peak becomes narrower. Therefore, the color purity of each of the first color filter CF1, second color filter CF2 and third color filter CF3 can be improved. In addition, since the wavelength range of the high reflectance of the second color filter CF2 or third color filter CF3, which is disposed under the silicon semiconductor layer, becomes wider, this second color filter CF2 or third color filter CF3 can further suppress light absorption in the silicon semiconductor layer. Thus, a liquid crystal display device with a good display quality can be provided.

FIG. 6 is a cross-sectional view which schematically shows a dielectric film multilayer 43 with a 9-layer structure, which constitutes the first color filter CF1, second color filter CF2 and third color filter CF3.

Specifically, the dielectric film multilayer 43 is composed of a first silicon nitride layer 311 which is disposed on the inner surface 10A of the first insulative substrate 10; a first silicon oxide layer 312 stacked on the first silicon nitride layer 311; a second silicon nitride layer 313 stacked on the first silicon oxide layer 312; a second silicon oxide layer 314 stacked on the second silicon nitride layer 313; a third silicon nitride layer 33 stacked on the second silicon oxide layer 314; a third silicon oxide layer 321 stacked on the third silicon nitride layer 33; a fourth silicon nitride layer 322 stacked on the third silicon oxide layer 321; a fourth silicon oxide layer 323 stacked on the fourth silicon nitride layer 322; and a fifth silicon nitride layer 324 stacked on the fourth silicon oxide layer 323.

The first silicon nitride layer 311, first silicon oxide layer 312, second silicon nitride layer 313 and second silicon oxide layer 314 function as the first semi-transmissive layer 31. The third silicon nitride layer 33 functions as the transmissive layer 33. The third silicon oxide layer 321, fourth silicon nitride layer 322, fourth silicon oxide layer 323 and fifth silicon nitride layer 324 function as the second semi-transmissive layer 32. Specifically, each of the first semi-transmissive layer 31 and second semi-transmissive layer 32 is a dielectric multilayer of four layers.

The first silicon nitride layer 311, second silicon nitride layer 313, third silicon nitride layer 33, fourth silicon nitride layer 322 and fifth silicon nitride layer 324 are formed of, e.g. SiN, and function as high-refractive-index layers (the refractive index in the visible light wavelength range is about 2.0 to 2.7). The first silicon oxide layer 312, second silicon oxide layer 314, third silicon oxide layer 321 and fourth silicon oxide layer 323 are formed of, e.g. $SiO_2$, and function as low-refractive-index layers (the refractive index in the visible light wavelength range is about 1.5).

The first silicon nitride layer 311, second silicon nitride layer 313, fourth silicon nitride layer 322 and fifth silicon nitride layer 324 have the same thickness, for example, 60 nm, in each of the first color filter CF1, second color filter CF2 and third color filter CF3. The first silicon oxide layer 312, second silicon oxide layer 314, third silicon oxide layer 321 and fourth silicon oxide layer 323 have the same thickness, for example, 90 nm, in each of the first color filter CF1, second color filter CF2 and third color filter CF3.

The third silicon nitride layer 33 has different film thicknesses in the first color filter CF1, second color filter CF2 and third color filter CF3, respectively. For example, the thickness of the third silicon nitride layer 33 in the first color filter CF1 is about 80 nm, the thickness of the third silicon nitride layer 33 in the second color filter CF2 is about 115 nm, and the thickness of the third silicon nitride layer 33 in the third color filter CF3 is about 30 nm.

The fifth silicon nitride layer 324 of the second color filter CF2 or third color filter CF3 serves as an underlayer of the silicon semiconductor layer.

The first color filter CF1, which is formed of the dielectric film multilayer 43 having the above-described structure, has a transmittance peak and a reflectance bottom in the neighborhood of 470 nm. In addition, in this first color filter CF1, compared to the first color filer CF1 that is formed of the dielectric film multilayer 42, the wavelength range in the neighborhood of the transmittance peak and reflectance bottom becomes narrower, and the wavelength range of a high reflectance becomes wider. Similarly, the second color filter CF2, which is formed of the dielectric film multilayer 43, has a transmittance peak and a reflectance bottom in the neighborhood of 540 nm. In addition, in this second color filter CF2, compared to the second color filer CF2 that is formed of the dielectric film multilayer 42, the wavelength range in the neighborhood of the transmittance peak and reflectance bottom becomes narrower, and the wavelength range of a high reflectance becomes wider. Likewise, the third color filter CF3, which is formed of the dielectric film multilayer 43, has a transmittance peak and a reflectance bottom in the neighborhood of 610 nm. In addition, in this third color filter CF3, compared to the third color filer CF3 that is formed of the dielectric film multilayer 42, the wavelength range in the neighborhood of the transmittance peak and reflectance bottom becomes narrower, and the wavelength range of a high reflectance becomes wider.

Thus, the color purity of each of the first color filter CF1, second color filter CF2 and third color filter CF3 can further be improved. In addition, the light absorption in the silicon semiconductor layer can further be suppressed. Therefore, a liquid crystal display device with a good display quality can be provided.

In the meantime, the position of the reflectance bottom of the reflection spectrum or the position of the transmittance peak of the transmission spectrum, in each of the first color filter CF1, second color filter CF2 and third color filter CF3, can be adjusted by varying the film thickness of the transmissive layer 33. The number of layers and the thickness of the transmissive layer can be determined, while taking into account the capabilities which are required in the first color filter CF1, second color filter CF2 and third color filter CF3, and the photo-leakage resistance.

Figure 7:
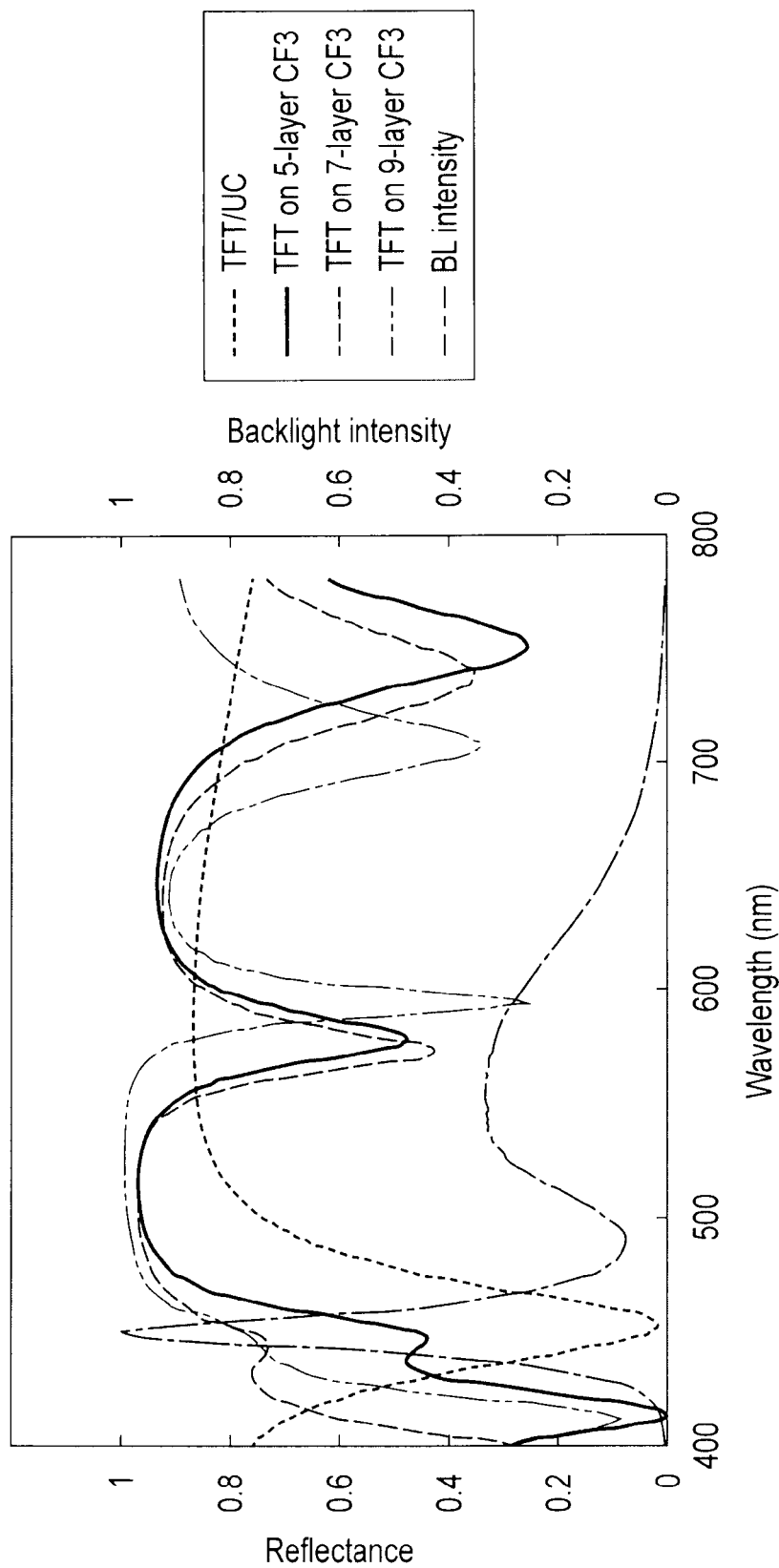
FIG. 7 is a graph showing an example of a relationship between a light emission spectrum of a backlight and reflection spectra of color filters of the embodiment.

FIG. 7 is a graph showing an example of the relationship between the light emission spectrum of the backlight 4 and the reflection spectra of the color filters of the embodiment. In FIG. 7, the abscissa indicates wavelength (nm) and the ordinate indicates the light intensity of the backlight 4 and the reflectance of the color filter. The light intensity and the reflectance are relative values in the case where the maximum value is set at 1.

The reflection spectra of the color filters, which are shown in FIG. 7, were obtained by calculating the reflectance on the first insulative substrate 10 side of the incident light from the first insulative substrate 10, with respect to a model which is fabricated in the following manner. A third color filter CF3 is disposed on the first insulative substrate. A polysilicon semiconductor layer with a thickness of 50 nm of a switching element is disposed on the third color filter CF3. This polysilicon semiconductor layer is covered with a first insulation film (gate insulation film) 11 with a thickness of 80 nm, which is formed of silicon oxide (SiO). A gate electrode with a thickness of 300 nm, which is formed of molybdenum (Mo), is disposed on the first insulation film.

In FIG. 7, "BL intensity" is a light emission spectrum of the backlight 4. FIG. 7 shows reflection spectra in a case (corresponding to "TFT on 5-layer CF3" in FIG. 7) where the dielectric film multilayer 41 of the 5-layer structure shown in FIG. 4 was applied to the structure of the third color filter CF3, a case where ("TFT on 7-layer CF3") where the dielectric film multilayer 42 of the 7-layer structure shown in FIG. 5 was applied to the structure of the third color filter CF3, and a case where ("TFT on 9-layer CF3") where the dielectric film multilayer 43 of the 9-layer structure shown in FIG. 6 was applied to the structure of the third color filter CF3. FIG. 7 shows, as a comparative example, a reflection spectrum in a case (corresponding to "TFT/UC" in FIG. 7) where only an undercoat layer (SiN/SiO), in place of the third color filter, was disposed under the switching element.

As shown in FIG. 7, the light emission spectrum of the backlight 4 has a light emission peak in the neighborhood of 450 nm. By contrast, in the reflection spectrum of "TFT/UC" of the comparative example, it is understood that the reflectance at the wavelength of 450 nm is very low. On the other hand, the reflectance spectrum of "TFT on 5-layer CF3" of the embodiment has a reflectance of about 50% in the neighborhood of 450 nm. In addition, the reflectance spectrum of "TFT on 7-layer CF3" has a reflectance of about 70% in the neighborhood of 450 nm. Besides, the reflectance spectrum of "TFT on 9-layer CF3" has a reflectance of about 80% in the neighborhood of 450 nm. It was thus confirmed that the reflectance of light in the neighborhood of a specific wavelength (450 nm in this example) increases as the number of layers of the dielectric film multilayer becomes larger.

Although not illustrated, the inventor conducted similar calculations in the case where the second color filter CF2 was disposed under the switching element, and confirmed that the reflectance of 50% or more was obtained in the neighborhood of 450 nm, and that the reflectance of light in the neighborhood of a specific wavelength increases as the number of layers of the dielectric film multilayer, which constitutes the second color filter CF2, becomes larger.

Figure 8:
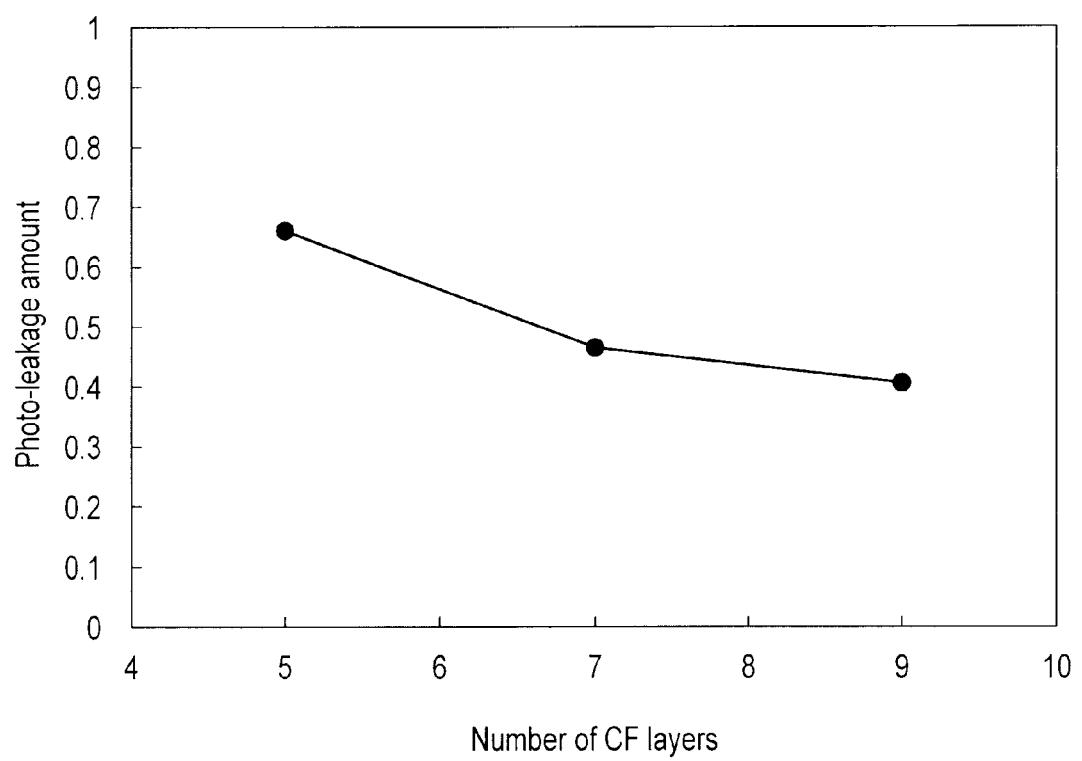
FIG. 8 is a graph showing a relationship between a photo-leakage amount in a switching element of each of pixels and the number of layers of the dielectric film multilayer.

FIG. 8 is a graph showing the relationship between the photo-leakage amount in the switching element of each of pixels and the number of layers of the dielectric film multilayer. In FIG. 8, the abscissa indicates the number of layers of the dielectric film multilayer (third color filter CF3) which is disposed under the switching element, and the ordinate indicates a ratio of a photo-leakage amount in the case where the photo-leakage amount at a time when only the undercoat layer (SiN/SiO), in place of the third color filter, was disposed under the switching element, is set at 1.

It was confirmed that the photo-leakage amount is about 65% when the switching element is disposed on the third color filter CF3 which is composed of the dielectric film multilayer 41 of the 5-layer structure. It was confirmed that the photo-leakage amount is about 45% when the switching element is disposed on the third color filter CF3 which is composed of the dielectric film multilayer 42 of the 7-layer structure. It was confirmed that the photo-leakage amount is about 40% when the switching element is disposed on the third color filter CF3 which is composed of the dielectric film multilayer 43 of the 9-layer structure.

The SiN layers, which are used as high-refractive-index layers in the 5-layer structure, 7-layer structure and 9-layer structure, are formed by plasma CVD using $SiH_4$ and $NH_3$ as a principal material gas, under the condition that the in-film hydrogen amount may become $2 \times 10^{21}$ $cm^{-3}$ or more. In order to obtain a film of a high refractive index, it can be thought that a silicon nitride (SiN) film is formed by, e.g. sputtering. In general, the in-film hydrogen amount in a SiN film that is formed by sputtering is very low. By using an SiN film containing hydrogen, the characteristics of a top-gate-type thin-film transistor, which serves a switching element, can be improved. For example, when polysilicon was used for the silicon semiconductor SC of the switching element, the threshold voltage of the thin-film transistor, in the case where the color filter layer was formed of a multiplayer of silicon nitride films and silicon oxide films formed by sputtering, was 5.0 V on average. On the other hand, the threshold voltage of the thin-film transistor, in the case where the color filter layer was formed of a multiplayer of silicon nitride films and silicon oxide films formed by plasma CVD with an in-film hydrogen amount of $2 \times 10^{21}$ cm$^{-3}$ or more, decreased to 2.1 V. Thereby, the active matrix circuit can be driven with a low voltage, contributing to reduction in power consumption.

As has been described above, according to the present embodiment, a liquid crystal display device which has a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising an array substrate comprising:
    a gate line;
    a first source line and a second source line which cross the gate line;
    a first color filter configured to transmit light in a first wavelength range;
    a second color filter configured to transmit light in a second wavelength range of greater wavelengths than the first wavelength range;
    a first switching element disposed above the second color filter;
    a second switching element disposed above the second color filter;
    a first pixel electrode which is electrically connected to the first switching element and is located directly above the first color filter; and
    a second pixel electrode which is electrically connected to the second switching element and is located directly above the second color filter,
    wherein the first switching element is electrically connected to the gate line and the first source line, and the second switching element is electrically connected to the gate line and the second source line.

2. The liquid crystal display device of claim 1, wherein the first color filter and the second color filter are constructed by stacking a plurality of thin films with different refractive indices.

3. The liquid crystal display device of claim 2, wherein the first color filter and the second color filter are a dielectric film multilayer in which a silicon nitride layer and a silicon oxide layer are alternately stacked.

4. The liquid crystal display device of claim 1, further comprising a backlight disposed on a back side of the array substrate,
    wherein a light emission spectrum of the backlight has a light emission peak in the first wavelength range.

5. The liquid crystal display device of claim 1, wherein the first wavelength range is a blue wavelength range.

6. A liquid crystal display device comprising an array substrate comprising:
    an insulative substrate;
    a first semi-transmissive layer disposed on the insulative substrate;
    a first transmissive layer with a first film thickness, a second transmissive layer with a second film thickness which is different from the first film thickness, and a third transmissive layer with a third film thickness which is different from the first film thickness and the second film thickness, the first transmissive layer, the second transmissive layer and the third transmissive layer being disposed on the first semi-transmissive layer;
    a second semi-transmissive layer disposed on the first transmissive layer to constitute a first color filter configured to transmit light in a first wavelength range, disposed on the second transmissive layer to constitute a second color filter configured to transmit light in a second wavelength range of greater wavelengths than the first wavelength range, and disposed on the third transmissive layer to constitute a third color filter configured to transmit light in a third wavelength range of greater wavelengths than the second wavelength range;
    a gate line:
    a first source line, a second source line, and a third source line which cross the gate line;
    a first switching element, a second switching element and a third switching element, which are disposed on the second semi-transmissive layer which constitutes the second color filter or the third color filter;
    a first pixel electrode which is electrically connected to the first switching element and is located above the first color filter;
    a second pixel electrode which is electrically connected to the second switching element and is located directly above the second color filter; and
    a third pixel electrode which is electrically connected to the third switching element and is located directly above the third color filter,
    wherein the first switching element is electrically connected to the gate line and the first source line, the second switching element is electrically connected to the gate line and the second source line, and the third switching element is electrically connected to the gate line and the third source line.

7. The liquid crystal display device of claim 6, wherein the first semi-transmissive layer includes a high-refractive-index layer which is stacked on the insulative substrate and has a higher refractive index than the insulative substrate, and a low-refractive-index layer which is stacked on the high refractive index layer and has a lower refractive index than the high-refractive-index layer.

8. The liquid crystal display device of claim 7, wherein the high-refractive-index layer is composed of a silicon nitride layer, and the low-refractive-index layer is composed of a silicon oxide layer.

9. The liquid crystal display device of claim 8, wherein the low-refractive-index layer is thicker than the high-refractive-index layer.

10. The liquid crystal display device of claim 6, wherein each of the first semi-transmissive layer and the second semi-transmissive layer is composed of a multilayer of a silicon nitride layer and a silicon oxide layer.

11. The liquid crystal display device of claim 10, wherein each of the first transmissive layer, the second transmissive layer, and the third transmissive layer is composed of a silicon nitride layer or a silicon oxide layer.

12. The liquid crystal display device of claim 11, wherein each of the first switching element, the second switching element and the third switching element is a top-gate-type thin-film transistor including a silicon semiconductor layer.

13. The liquid crystal display device of claim 12, wherein an in-film hydrogen amount of a silicon nitride layer, which is used for the first semi-transmissive layer, or the second semi-transmissive layer, or the first transmissive layer, or the second transmissive layer, or the third transmissive layer, is $2 \times 10^{21}$ cm$^{-3}$ or more.

14. The liquid crystal display device of claim 6, further comprising a backlight disposed on a back side of the array substrate,
wherein a light emission spectrum of the backlight has a light emission peak in the first wavelength range.

15. The liquid crystal display device of claim 6, wherein the first wavelength range is a blue wavelength range.

16. A liquid crystal display device comprising an array substrate comprising:
a gate line;
a first source line and a second source line which cross the gate line;
a first pixel which displays a first color; and
a second pixel which displays a second color different from the first color;
wherein the first pixel includes a first color filter with a first film thickness, a second color filter with a second film thickness which is different from the first film thickness, a first switching element which is electrically connected to the gate line and the first source line and is located directly above the second color filter, and a first pixel electrode which is electrically connected to the first switching element and is located directly above the first color filter, the first color filter being configured to transmit the first color, and the second color filter being configured to transmit a third color different from the first color and the second color, and
the second pixel includes a third color filter with a third film thickness which is different from the first film thickness and the second film thickness, a fourth color filter with the second film thickness, a second switching element which is electrically connected to the gate line and the second source line and is located directly above the fourth color filter, and a second pixel electrode which is electrically connected to the second switching element and is located directly above the third color filter, the third color filter being configured to transmit the second color, and the fourth color filter being configured to transmit the third color.

* * * * *